United States Patent [19]

Thomas

[11] Patent Number: 4,541,376
[45] Date of Patent: Sep. 17, 1985

[54] INTERNAL COMBUSTION ENGINE

[76] Inventor: Alun Thomas, P.O. Box 1, Chester, Cheshire, CH1 3SH, United Kingdom

[21] Appl. No.: 559,604

[22] Filed: Dec. 8, 1983

[30] Foreign Application Priority Data

Dec. 20, 1982 [GB] United Kingdom ............... 8236149

[51] Int. Cl.⁴ .............................................. F02B 3/00
[52] U.S. Cl. ..................................... 123/280; 123/263
[58] Field of Search ............... 123/262, 263, 280, 306, 123/307

[56] References Cited

U.S. PATENT DOCUMENTS

| | | | |
|---|---|---|---|
| 383,570 | 5/1943 | Pischinger | 123/263 |
| 2,172,520 | 9/1939 | Riffey et al. | 123/280 |
| 2,842,106 | 7/1958 | Meurer | 123/263 |
| 3,038,455 | 6/1962 | Dobrosavljevic | 123/263 |
| 3,039,445 | 6/1962 | Crowther et al. | 123/280 |
| 3,244,159 | 4/1966 | Meurer | 123/263 |
| 3,386,421 | 6/1968 | Hoffman | 123/280 |
| 4,046,111 | 9/1977 | Nagano | 123/280 |
| 4,186,692 | 2/1980 | Kawamura | 123/263 |
| 4,284,044 | 8/1981 | Nakanishi | 123/307 |

FOREIGN PATENT DOCUMENTS

| | | | |
|---|---|---|---|
| 1526305 | 7/1969 | Fed. Rep. of Germany | 123/280 |
| 54-71211 | 6/1979 | Japan | 123/263 |
| 520597 | 4/1940 | United Kingdom | 123/263 |

*Primary Examiner*—Ronald B. Cox
*Attorney, Agent, or Firm*—Jones, Tullar & Cooper

[57] ABSTRACT

Spark ignited internal combustion engine of the reciprocal piston type, having inlet means 7 for substantially tangentially introducing a combustible mixture into a combustion chamber 6 to generate a swirling motion of the mixture and provided with means 16 for breaking up the swirling motion so as to produce turbulence at or near the end of the compression stroke of the piston 3.

4 Claims, 6 Drawing Figures

INTERNAL COMBUSTION ENGINE

TECHNICAL FIELD

The invention relates to a spark ignited internal combustion engine, and more particularly to a reciprocal piston type internal combustion engine with one or more combustion chambers having a shape or being provided with means for generating motion of an air/fuel mixture when the piston(s) of the internal combustion engine is (are) performing a compression stroke. The motion of the air/fuel mixture causes an increase in the rate of combustion thereof so that the engine efficiency is advantageously influenced.

PRIOR ART

In view of the rise in fuel energy prices, especially over the last decade, there is a growing interest in increasing the thermal efficiency of internal combustion engines. Increase of the thermal efficiency can in general be attained via two different ways, viz. the use of higher compression ratio and the use of leaner air/fuel mixtures. Both ways, however, have their limitations; higher compression ratios are limited by knock and lean mixture operation is limited by increasing slowness of combustion. Since high compression ratios promote combustion of lean mixtures, while lean mixtures are less prone to knock, both trends in conjunction will lessen each other's limitations. The slowness of normal combustion, however, sets a limitation to progress in both directions.

If the combustion could be speeded up, there would be less time for knock to set in at the higher compression ratios on the one hand, and lean mixture combustion would become more satisfactory on the other. The crucial factor which determines the duration of combustion is the rate of development of flame area from that of the initial flame kernel to that of a convoluted flame penetrating through much of the combustion chamber. Apart from mixture strength, the most important factor likely to influence the duration of combustion significantly is the motion of the air/fuel mixture in the combustion chamber. In order to reduce the duration of combustion, several methods have been proposed in the past.

A first known method consists of generating a swirl motion or turbulence in an air/fuel mixture in the combustion chamber during introduction of the mixture. In a further known method turbulence is generated in the combustion chamber for example by the squish action between the cylinder head and the piston.

The above methods, however, have insufficient influence on the duration of combustion. In the first method, turbulent motion generated at the time of the intake stroke becomes weak during the compression stroke and is likely to have decayed greatly by the time the air/fuel mixture is ignited, while swirl motion, through continuing, has relatively little effect on the rate of combustion. Also turbulence generating devices interfere with the breathing of the engine. Turbulence generated by squish, i.e. displacement of part of the air/fuel mixture from regions of small piston clearance, at the top of the compression stroke is normally produced later than desirable. Further, there can be significant losses from thermodynamic irreversibility suffered during the process and during the reverse motion as the piston descends.

Another known method consists of generating turbulence by the expansion of burning gases during the early stages of combustion through a passage in a divided combustion chamber. In this case the turbulence is again generated rather late, and is associated with substantial losses due to irreversibility as well as with greater heat losses than normal. Turbulence generated by simple displacement of the piston in its cylinder is too small to effect a significant increase in the rate of combustion.

SUMMARY OF THE INVENTION

The object of the present invention is to provide an improved internal combustion engine capable of burning combustible mixtures significantly more rapidly as an aid to improving efficiency.

According to the invention, an internal combustion engine is provided comprising a cylinder block having a cylinder bore therein, a cylinder head mounted on said cylinder block, a piston reciprocally movable in said cylinder bore, thereby defining a combustion chamber of varying geometry, an intake valve movably mounted in said cylinder head and cooperating with inlet means for introducing a combustible mixture substantially tangentially into said combustion chamber to generate a swirling motion of the combustible mixture, an exhaust valve movably mounted in said cylinder head and cooperating with outlet means for discharging an exhaust gas from the combustion chamber, and a device for producing ignition within said combustion chamber, which combustion chamber houses a spoiling device for breaking up the swirling motion of the combustible mixture in the combustion chamber so as to produce turbulence in the form of small scale eddies at or near the end of the compression stroke of the piston.

The turbulence generated at or near the end of the compression stroke of the piston will cause an important increase in the rate of combustion compared with the rate of combustion obtainable with the known methods. Since small scale eddies decay very rapidly, within a few milliseconds, the timing of the induction of turbulence takes on a crucial significance. In the internal combustion engine according to the invention the production of turbulence is delayed until the end of the compression stroke so that a full profit of the turbulence at the moment of the ignition is made. Furthermore, the method of producing turbulence in the proposed combustion engine does not interfere with the breathing of the engine, nor with the expansion of the working fluid during the power stroke.

BRIEF DESCRIPTION OF THE DRAWINGS

The invention will now be described in more detail with reference to the accompanying drawings, in which.

DETAILED DESCRIPTION

Figure 2:
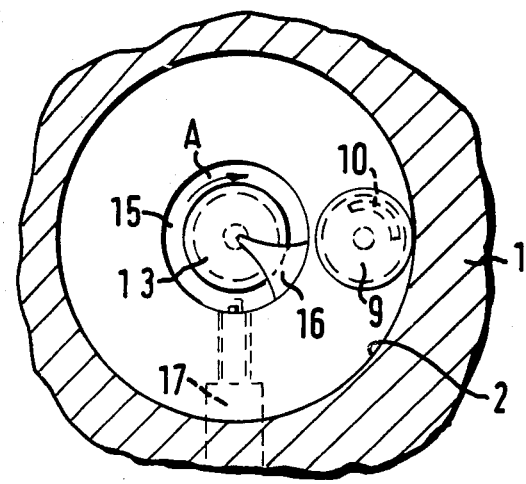
FIG. 2 is a cross-sectional view taken along the line II—II in FIG. 1.

It should be noted that identical elements shown in the drawings have been indicated with the same reference numeral.

Figure 1:
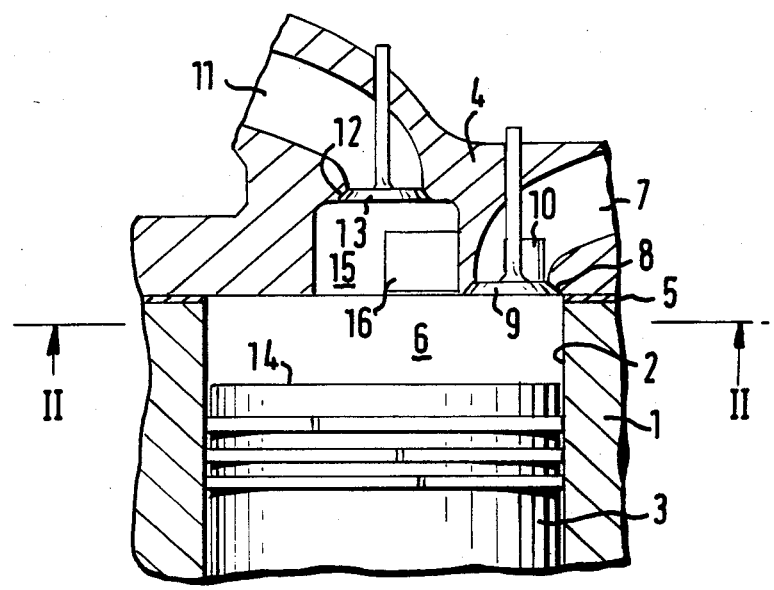
FIG. 1 is a cross-sectional view of a first embodiment according to the invention.

Referring to FIGS. 1 and 2, a cylinder block 1 is shown having a cylinder bore 2 in which a piston 3 is reciprocally movable. A cylinder head 4 is suitably secured onto the cylinder block 1 with a gasket 5 arranged therebetween. The cylinder block 1, piston 3 and cylinder head 4 cooperate with one another to define a combustion chamber 6 of varying geometry. The cylinder head 4 is provided with an inlet conduit 7 having a downstream end, with respect to the flow of combustible mixture through the inlet conduit, formed with a valve seat 8 of an intake valve 9. The intake valve 9 is provided with a deflector element 10 for deflecting the flow of the combustible mixture in said conduit 7, thereby urging the mixture to enter into the cylinder bore 2 in substantially a tangential direction to the wall of said bore. The cylinder head 4 is further provided with an outlet conduit 11 having an upstream end, with respect to the flow of exhaust gas through the outlet conduit, formed with a valve seat 12 of an exhaust valve 13.

In this first shown embodiment according to the invention the piston 3 is provided with a substantially flat piston head 14, while the cylinder head 4 has a recess 15 being substantially coaxial with the cylinder bore 2. In order to attain a higher compression ratio the recess 15 has a cross sectional area which is substantially smaller than that of the cylinder bore 2. The inner wall of the cylinder head 4 forming recess 15 is provided with an inwardly extending protrusion or baffle 16. The cylinder head 4 is further provided with a spark plug 17 arranged adjacent to protrusion 16 and extending into a quiescent zone of the recess 15.

During operation of the above described cylinder/piston construction of for example a four stroke internal combustion engine, an air/fuel mixture from a not shown carburettor is sucked into the combustion chamber 6 via inlet conduit 7 by opening intake valve 9 and downwardly moving the piston 3. From inlet conduit 7 the air/fuel mixture enters the cylinder bore 2 in substantially a tangential direction to the wall of said bore. The tangential entry of the combustible mixture results in a forced swirl or vortex of the mixture within the cylinder bore. As the vortex is largely of a rigid type of rotation and is associated with only a rather moderate velocity gradient at the cylinder wall it will persist during the downward inlet stroke and the consecutive compression stroke of the piston 3. During the compression stroke the swirling air/fuel mixture is compressed into the upper part of the combustion chamber 6 formed by the relatively small recess 15. As a consequence thereof the angular velocity of the vortex is accelerated. At the same moment the relatively large vortex is broken up into a plurality of small scale eddies, causing a highly seared movement of the air/fuel mixture. The greatest mass flow into the recess takes place towards the end of the compression stroke, so that turbulence is principally generated shortly before the passage of the spark. The highly turbulent air/fuel mixture is subsequently ignited by the spark plug 17. Due to the heavy turbulence of the combustible mixture the flame thus ignited propagates rapidly over the entire space in the recess 15, thereby minimizing the risk of knock. The specific arrangement of the spark plug 17 near the protrusion 16, facing towards the relatively sheltered portion of recess 15 directly sidewards of said protrusion 16 allows the flame to be less affected by the motion of the mixture during the early stages of its growth, after which it is caught up in the highly sheared gas movement. The main flow direction in recess 15 has been indicated in FIG. 2 by arrow A.

Figure 4:
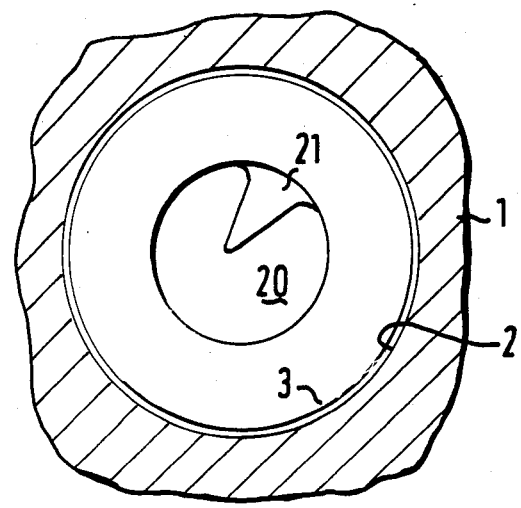
FIG. 4 is a cross-sectional view taken along the line IV—IV in FIG. 3.
Figure 3:
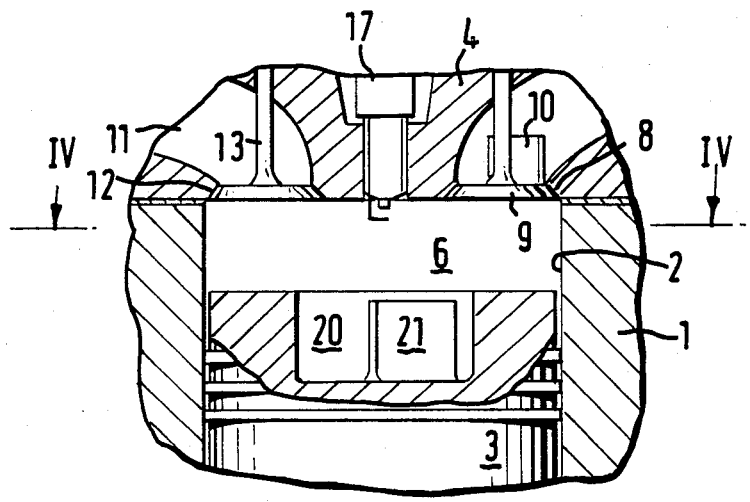
FIG. 3 is a cross-sectional view of a second embodiment according to the invention.

Reference is now made to FIGS. 3 and 4 showing a second embodiment of an internal combustion engine according to the invention.

The piston 3 shown in FIGS. 3 and 4 is provided with a recess 20 in the head thereof. The recess 20 forms the lower part of the combustion chamber 6, and has a relatively small cross-sectional area compared with the cross-sectional area of the cylinder bore 2. In said recess 20 a spoiling device 21 is mounted for transforming a swirling movement of the combustible mixture into a highly turbulent movement. As shown in FIG. 4, the spoiling device 21 has a substantially tapering shape in cross-section, allowing transfer of heat to the piston, thereby preventing overheating of the spoiling device during combustion. The spark plug 17 is arranged in a passage in the cylinder head 4 in such a manner that in the upward position of the piston 3 the lower end of spark plug 17 is located in a quiescent zone near the spoiling device 21 in recess 20.

During operation of this cylinder/piston construction shown in FIGS. 3 and 4, a combustible mixture tangentially enters into the combustion chamber 6 at the intake stroke of the piston, which results in a forced swirl of the mixture within the cylinder bore 2. At the compression stroke of the piston the downward swirling movement of the mixture is transformed into an upward swirling movement. When the piston has reached a level near to the cylinder head the swirling mixture is compressed into the rather small recess 20, causing a considerable acceleration of the swirling movement. The presence of spoiling device 21 causes a break-up of the swirling movement into random vortices resulting in a highly sheared movement of the mixture. As a consequence thereof the flame formed via spark plug 17 propagates rapidly through the whole mixture in recess 20, so that the risk of knock is minimized.

Figure 6:
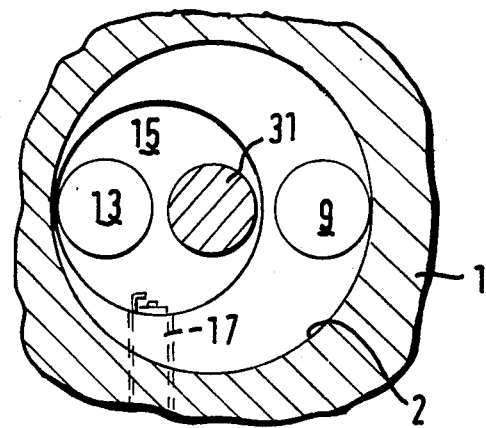
FIG. 6 is a cross-sectional view taken along the line VI—VI in FIG. 5.
Figure 5:
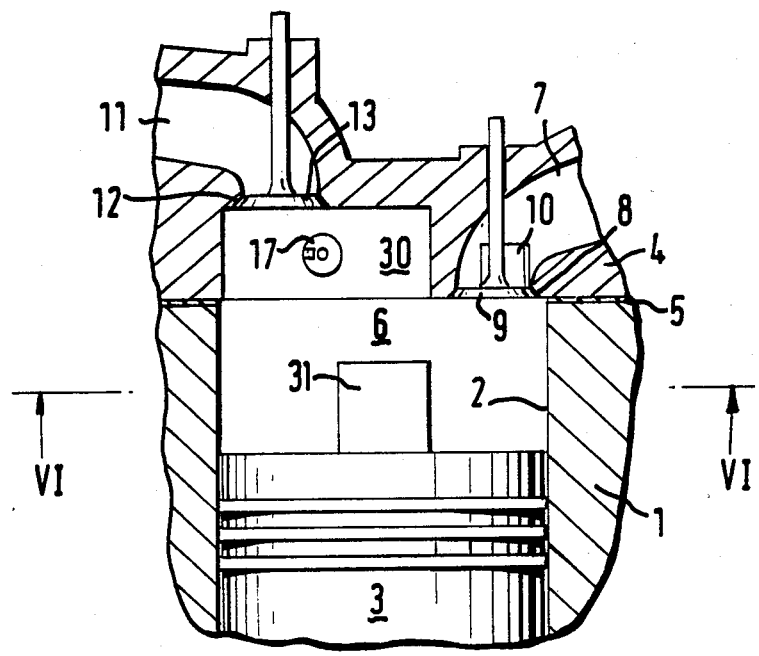
FIG. 5 is a cross-sectional view of a third embodiment according to the invention.

Reference is now made to FIGS. 5 and 6 showing a third embodiment of an internal combustion engine according to the invention. In this third embodiment the cylinder head 4 has a recess 30 which is eccentric to the cylinder bore axis, but is cylindrical and posesses no baffle. The piston is provided with a central axial protrusion 31.

During operation of this cylinder/piston construction, shown in FIGS. 5 and 6, a combustible mixture tangentially enters the cylinder during the intake stroke of the piston. During compression the swirling motion continues smoothly within the cylinder bore during the greater part of the compression stroke, the rotation accelerating as the mixture enters the recess. Since the protrusion 31 is centrally arranged, it does not interfere significantly with swirling motion during the greater part of the compression stroke. Towards the end of the compression stroke the protrusion 31 on the piston enters the off-centre recess 30 in the cylinder head and destroys the swirling motion therein, converting it to turbulence and causing the flame formed via spark plug 17 to propagate rapidly through the whole mixture in recess 30.

A fourth suitable embodiment of the invention—not shown here—is the converse of the third embodiment which was shown in FIGS. 5 and 6. In this further arrangement there is a concentric recess in the piston as in FIG. 3, but with no baffle. The cylinder head is furnished with an eccentric protrusion which enters the piston recess towards the end of the compression stroke, thereby acting as a spoiler converting swirling motion into turbulence.

It should be noted that the invention is not restricted to the particular means shown in the Figures, for causing a tangential entry of gas into the combustion chamber 6.

The inlet conduit itself may be so disposed as to urge the combustible mixture to enter into the cylinder bore in a substantially tangential direction. A so disposed inlet conduit may be further provided with a deflector to enhance this effect.

The invention is further not restricted to a particular type of spoiling device for generating turbulent gas movement. Instead of the baffles shown in the Figures, it might for example be possible to use spoiling devices formed by eccentrically arranged grids.

Finally, the invention is not restricted to a particular position of the ignition device. Instead of the shown arrangements, in which the ignition device protrudes into the combustion chamber, the ignition device may be totally arranged outside the combustion chamber.

I claim:

1. An internal combustion engine, comprising:
   a cylinder block within which at least one cylinder bore is defined;
   a cylinder head mounted on the cylinder block;
   a piston mounted for reciprocable movement in each bore;
   an inlet valve movably mounted in the cylinder head for each cylinder bore;
   a variable geometry chamber defined by the cylinder head, the cylinder bore and the piston; inlet means for each cylinder bore through which a combustible mixture is introduced tangentially into the variable geometry chamber, said inlet means cooperating with its respective inlet valve to generate a swirling motion of the combustible mixture within its respective variable geometry chamber;
   a recess formed in at least one of each piston and adjacent cylinder head to define at the end of the compression stoke of the associated piston a combustion chamber having a substantially smaller cross-section than the cylinder bore;
   an exhaust valve movably mounted in the cylinder head for each cylinder bore;
   outlet means for each cylinder bore, said outlet means cooperating with its respective exhaust valve for discharging exhaust gas from the combustion chamber;
   an ignition device in each combustion chamber for producing ignition therein; and
   a spoiling device within each combustion chamber for breaking up the swirling motion of the combustible gas at or near the end of the associated piston's compression stroke so as to produce turbulence in the form of small eddies.

2. The internal combustion engine as defined in claim 1, wherein the ignition device is arranged in a quiescent zone of the combustion chamber near the spoiling device.

3. The internal combustion engine as defined in claim 1, wherein the spoiling device comprises a protrusion which is substantially eccentrically arranged in the combustion chamber.

4. The internal combustion engine as defined in claim 3, wherein the ignition device is arranged in a quiescent zone of the combustion chamber near the spoiling device.

* * * * *